United States Patent
Seo et al.

(10) Patent No.: US 10,568,054 B2
(45) Date of Patent: Feb. 18, 2020

(54) METHOD FOR RECEIVING SYNCHRONIZING SIGNALS FOR DIRECT COMMUNICATION BETWEEN TERMINALS IN WIRELESS COMMUNICATION SYSTEM, AND DEVICE FOR SAME

(71) Applicant: LG ELECTRONICS INC., Seoul (KR)

(72) Inventors: Hanbyul Seo, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 15/309,723

(22) PCT Filed: Jun. 17, 2015

(86) PCT No.: PCT/KR2015/006144
§ 371 (c)(1),
(2) Date: Nov. 8, 2016

(87) PCT Pub. No.: WO2015/194859
PCT Pub. Date: Dec. 23, 2015

(65) Prior Publication Data
US 2017/0265154 A1    Sep. 14, 2017

Related U.S. Application Data

(60) Provisional application No. 62/013,517, filed on Jun. 17, 2014, provisional application No. 62/109,037, filed on Jan. 28, 2015.

(51) Int. Cl.
*H04W 56/00*  (2009.01)
*H04W 76/27*  (2018.01)
*H04W 72/04*  (2009.01)

(52) U.S. Cl.
CPC ....... *H04W 56/001* (2013.01); *H04W 72/048* (2013.01); *H04W 72/0446* (2013.01); *H04W 76/27* (2018.02)

(58) Field of Classification Search
CPC ........... H04W 56/001; H04W 56/0035; H04W 76/27; H04W 72/0446; H04W 72/048
See application file for complete search history.

(56) References Cited

U.S. PATENT DOCUMENTS 9,807,717 B2 * 10/2017 Wu ..................... H04W 56/001
2007/0060067 A1    3/2007 Ruuska
(Continued)

FOREIGN PATENT DOCUMENTS

CN    101227726 A    7/2008
CN    103250435 A    8/2013
(Continued)

OTHER PUBLICATIONS

Ericsson, "Synchronization Signals and Channel Design for D2D", 3GPP TSG RAN WG1 Meeting #77, R1-142409, Seoul, Korea, May 19-23, 2014, 8 pages.
(Continued)

*Primary Examiner* — Vinncelas Louis
(74) *Attorney, Agent, or Firm* — Birch, Stewart, Kolasch & Birch, LLP

(57) ABSTRACT

A method of receiving a synchronization signal for device-to-device (D2D) communication by a user equipment (UE) in a wireless communication system is provided. A synchronization signal is received from a base station (BS) to acquire synchronization. Information on capability of the UE related with a synchronization mode is transmitted to the BS. Information on the synchronization mode indicating a first synchronization mode or a second synchronization mode is received from the BS. A reference synchronization
(Continued)

of transmitting a D2D signal is determined based on the synchronization mode. When the information on the synchronization mode indicates the second synchronization mode, a synchronization signal is received from a device except for the BS to acquire synchronization for D2D communication.

10 Claims, 12 Drawing Sheets

(56) References Cited

U.S. PATENT DOCUMENTS

| | | | |
|---|---|---|---|
| 2011/0268101 A1* | 11/2011 | Wang | H04L 5/0053 370/344 |
| 2014/0056220 A1 | 2/2014 | Poitau et al. | |
| 2014/0112194 A1 | 4/2014 | Novlan et al. | |
| 2014/0140269 A1* | 5/2014 | Tavildar | H04W 56/0035 370/328 |
| 2015/0245395 A1* | 8/2015 | Yamazaki | H04W 72/042 455/426.1 |
| 2015/0296458 A1* | 10/2015 | Abraham | H04W 52/0225 370/311 |
| 2015/0296469 A1* | 10/2015 | Yoon | H04W 56/0015 370/350 |
| 2015/0341873 A1* | 11/2015 | Abedini | H04W 56/001 370/336 |

FOREIGN PATENT DOCUMENTS

| | | |
|---|---|---|
| CN | 103828398 A | 5/2014 |
| EP | 1758308 A1 | 2/2007 |
| WO | WO 2008/126295 A1 | 10/2008 |
| WO | WO 2013/002688 A1 | 1/2013 |
| WO | WO 2013/075340 A1 | 5/2013 |
| WO | WO 2013/081393 A1 | 6/2013 |
| WO | WO 2013/138814 A1 | 9/2013 |
| WO | WO-2013191360 A1 * | 12/2013 ........ H04W 72/1247 |
| WO | WO 2014/031703 A1 | 2/2014 |

OTHER PUBLICATIONS

Huawei et al., "D2D Synchronization Procedure in Partial Network Coverage", 3GPP TSG RAN WG1 Meeting #76b, R1-141142, Shenzen, China, Mar. 31-Apr. 4, 2014, 3 pages.

LG Electronics, "Control design for D2D broadcast communication", 3GPP TSG RAN WG1 Meeting #77, R1-142146, Seoul, Korea, May 19-23, 2014, 7 pages.

Samsung, "D2D Synchronization Signal and Channel Design" 3GPP TSG RAN WG1 #77, R1-142120, Seoul, South Korea, May 19-May 23, 2014, 6 pages.

HTC, "D2D Synchronization between in and out of Coverage UEs," 3GPP TSG RAN WG1 Meeting #76, R1-140225, Prague, Czech Republic, Feb. 10-14, 2014, pp. 1-3.

Institute for Information Industry (III), "Performance of D2D Synchronization Source Selection and D2DSS Transmission," 3GPP TSG-RAN WG1 Meeting #76bis, R1-141498, Shenzhen, China, Mar. 31-Apr. 4, 2014, 5 pages.

Lin et al., "An Overview of 3GPP Device-to-Device Proximity Services," IEEE Communications Magazine, vol. 52, Issue 4, Apr. 2014, pp. 40-48.

* cited by examiner (a) Control-plane protocol stack (b) User-plane protocol stack

METHOD FOR RECEIVING SYNCHRONIZING SIGNALS FOR DIRECT COMMUNICATION BETWEEN TERMINALS IN WIRELESS COMMUNICATION SYSTEM, AND DEVICE FOR SAME

CROSS REFERENCE TO RELATED APPLICATIONS

This application is the National Phase of PCT International Application No. PCT/KR2015/006144, filed on Jun. 17, 2015, which claims priority under 35 U.S.C. 119(e) to U.S. Provisional Application No's. 62/013,517 and 62/109,037, filed on Jun. 17, 2014 and Jan. 28, 2015, respectively, all of which are hereby expressly incorporated by reference into the present application.

TECHNICAL FIELD

The present invention relates to a wireless communication system, and more particularly, to a method and device for receiving a synchronization signal for device-to-device (D2D) communication in a wireless communication system.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE

Technical Problem

An object of the present invention devised to solve the problem lies in a method and device for receiving a synchronization signal for device-to-device (D2D) communication in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method of receiving a synchronization signal for device-to-device (D2D) communication by user equipment (UE) in a wireless communication system, the method including receiving a synchronization signal from a first type device to acquire synchronization, receiving information on a synchronization mode indicating a first synchronization mode or a second synchronization mode from the first type device, and when the synchronization mode is the second synchronization mode, receiving a synchronization signal from the second type device to acquire synchronization for D2D communication. In another aspect of the present invention, provided herein is a user equipment (UE) device for receiving a synchronization signal for device-to-device (D2D) communication in a wireless communication system, the UE device including a transceiver for transmitting and receiving a signal to and from a first type device, a second type device, or a counterpart UE device of D2D communication, and a processor for processing the signal, wherein the processor receives a synchronization signal from a first type device to acquire synchronization, receives information on a synchronization mode indicating a first synchronization mode or a second synchronization mode from the first type device, and receives a synchronization signal from the second type device to acquire synchronization for D2D communication when the synchronization mode is the second synchronization mode.

The following features according to the aforementioned embodiments will be commonly applied.

When the synchronization mode is the first synchronization mode, the synchronization for D2D communication may be acquired using only the synchronization signal received from the first type device.

When the synchronization mode is the second synchronization mode, time synchronization for D2D communication may be acquired based on the synchronization signal received from the second type device, and frequency synchronization for D2D communication may be acquired based on the synchronization signal received from the first type device.

The method may further include receiving information on resource allocation from the first type device, wherein the information on resource allocation may include information indicating a resource for receiving a synchronization signal from the second type device.

The first type device may be a base station (BS) that wirelessly communicates with the UE, and the second type device may be a device except for the first type device.

The method may further include transmitting information on supported capability of the second synchronization mode to the first type device.

The UE may perform D2D according to synchronization acquired from the second type device during a predetermined subframe at a preset time point.

Here, when a signal to the first type device and a signal to a counterpart UE of D2D communication are simultaneously scheduled in the predetermined frame, the signal to the counterpart UE may be prioritized top the signal to the first type device.

The method may further include generating a synchronization signal between UEs based on a sequence generation root index, and transmitting the generated synchronization signal between the UEs to a counterpart of D2D communication, wherein the sequence generation root index is set to a different value in the first synchronization mode and the second synchronization mode.

The method may further include transmitting data to a counterpart UE of D2D communication, wherein a parameter of the data may be differently set with respect to the first synchronization mode and the second synchronization mode. Here, the parameter of the data may include at least one of a demodulation reference signal sequence formation parameter and a scrambling sequence formation parameter.

The method may further include receiving a downlink signal from the first type device through a specific subframe, and performing D2D communication with an uplink subframe corresponding to the specific subframe when uplink grant is not included in the downlink signal. Here, the method may further include performing D2D communication in at least one subframe subsequent to the specific subframe.

It is to be understood that both the foregoing general description and the following detailed description of the present invention are exemplary and explanatory and are intended to provide further explanation of the invention as claimed.

Advantageous Effects

According to the present invention, a synchronization signal may be received in order to effectively perform a device-to-device (D2D) operation in a wireless communication system. In detail, synchronization for D2D communication may be effectively acquired.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and 3GPP LTE-A system. However, technical features of the present invention are not limited thereto.

Figure 1:
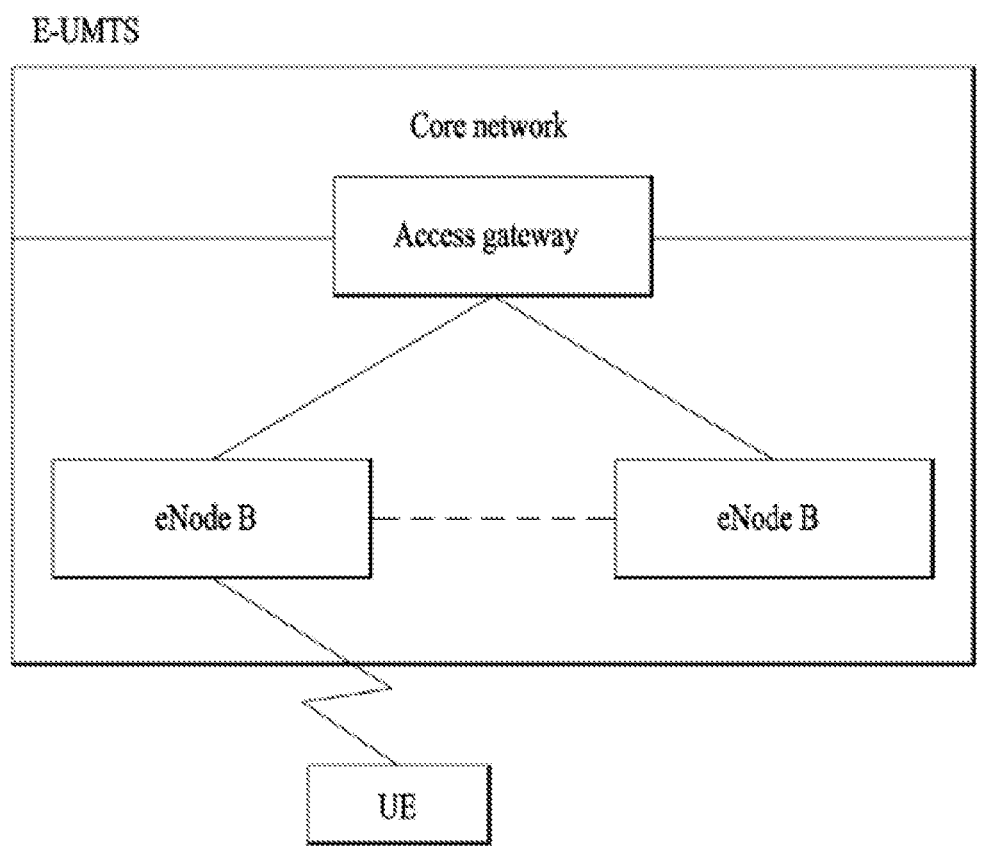
FIG. 1 is a diagram illustrating a structure of an E-UMTS network as an example of a wireless communication system.
Figure 2:
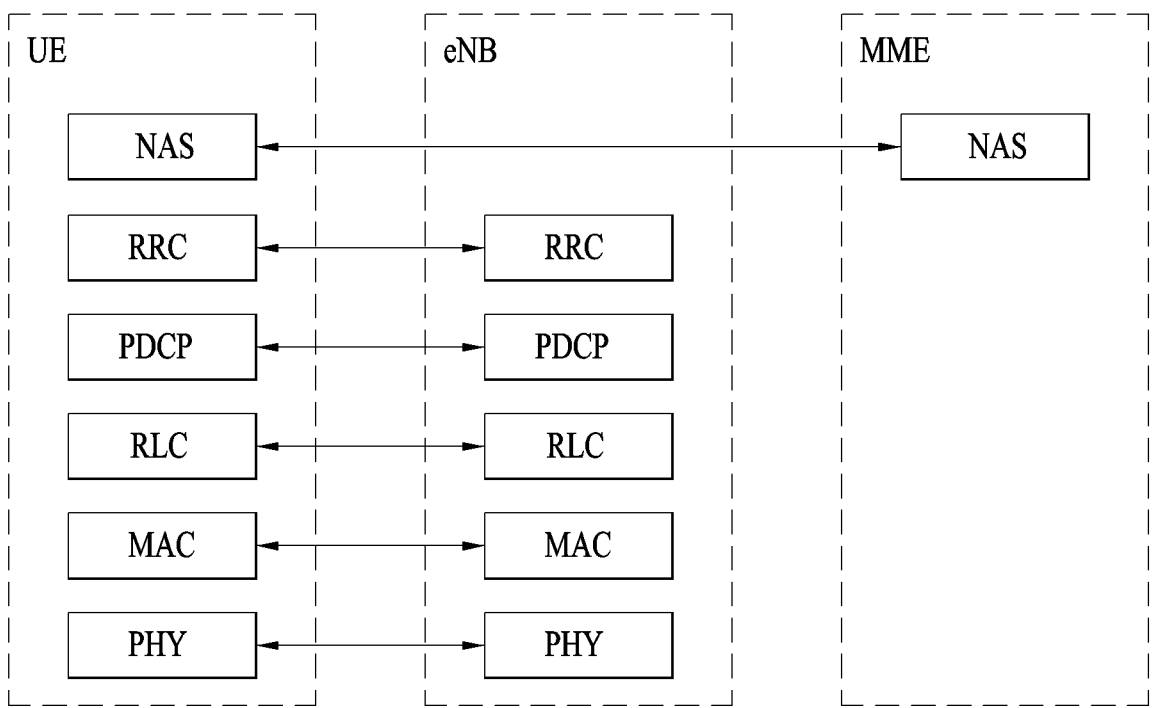
FIG. 2 is a diagram illustrating a control plane and a user plane of a radio interface protocol between user equipment (UE) and E-UTRAN based on the 3GPP wireless access network standard.
Figure 2:
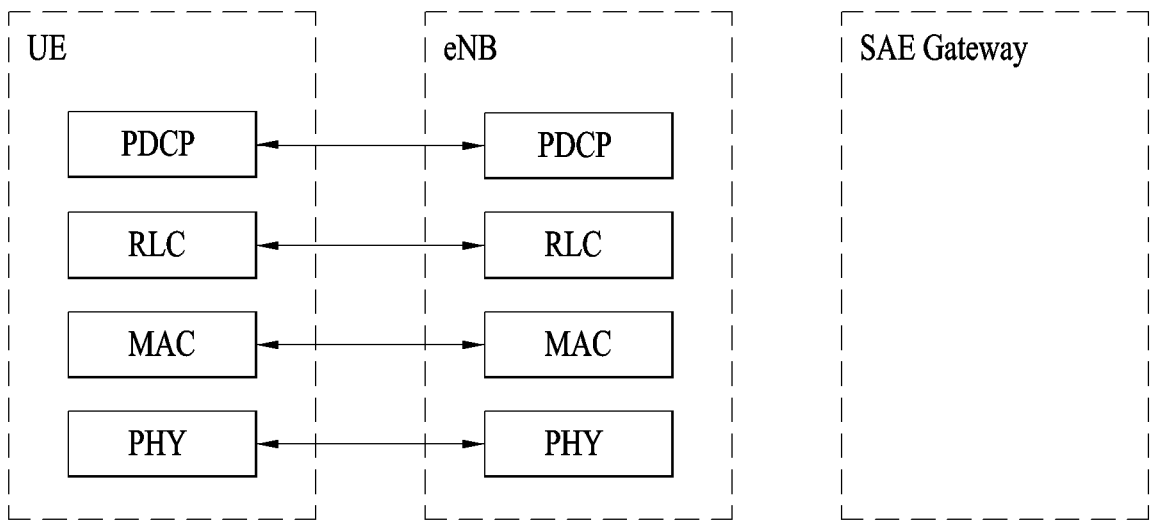

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
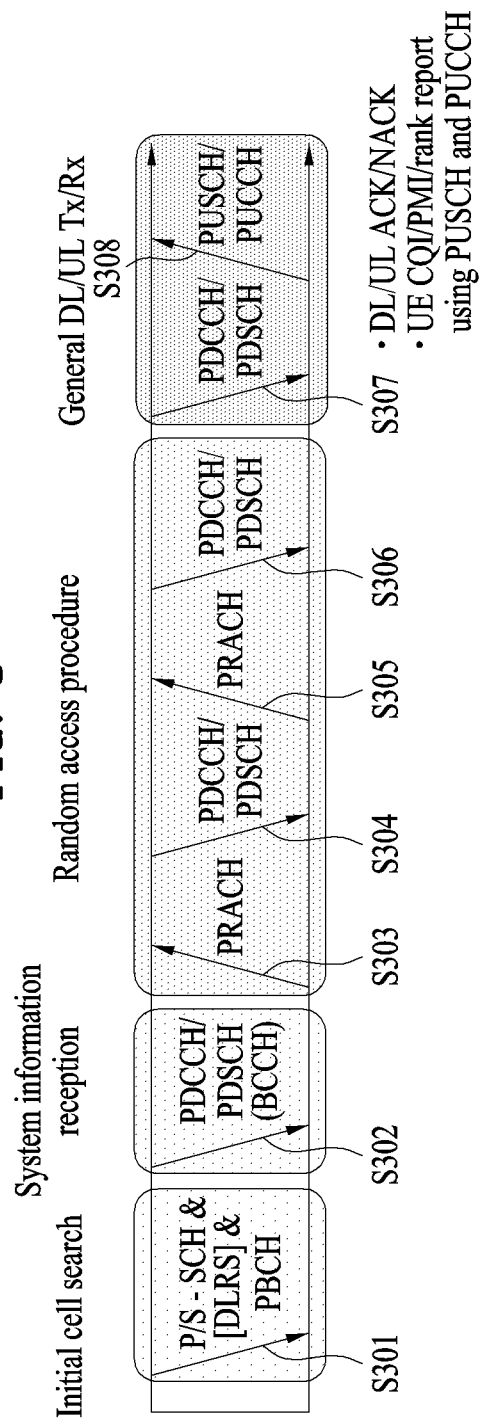
FIG. 3 is a diagram illustrating physical channels used in a 3GPP LTE system and a general method of transmitting a signal using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose. Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

The structure of a radio frame of 3GPP LTE system will be described with reference to FIG. 4.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

Figure 4:
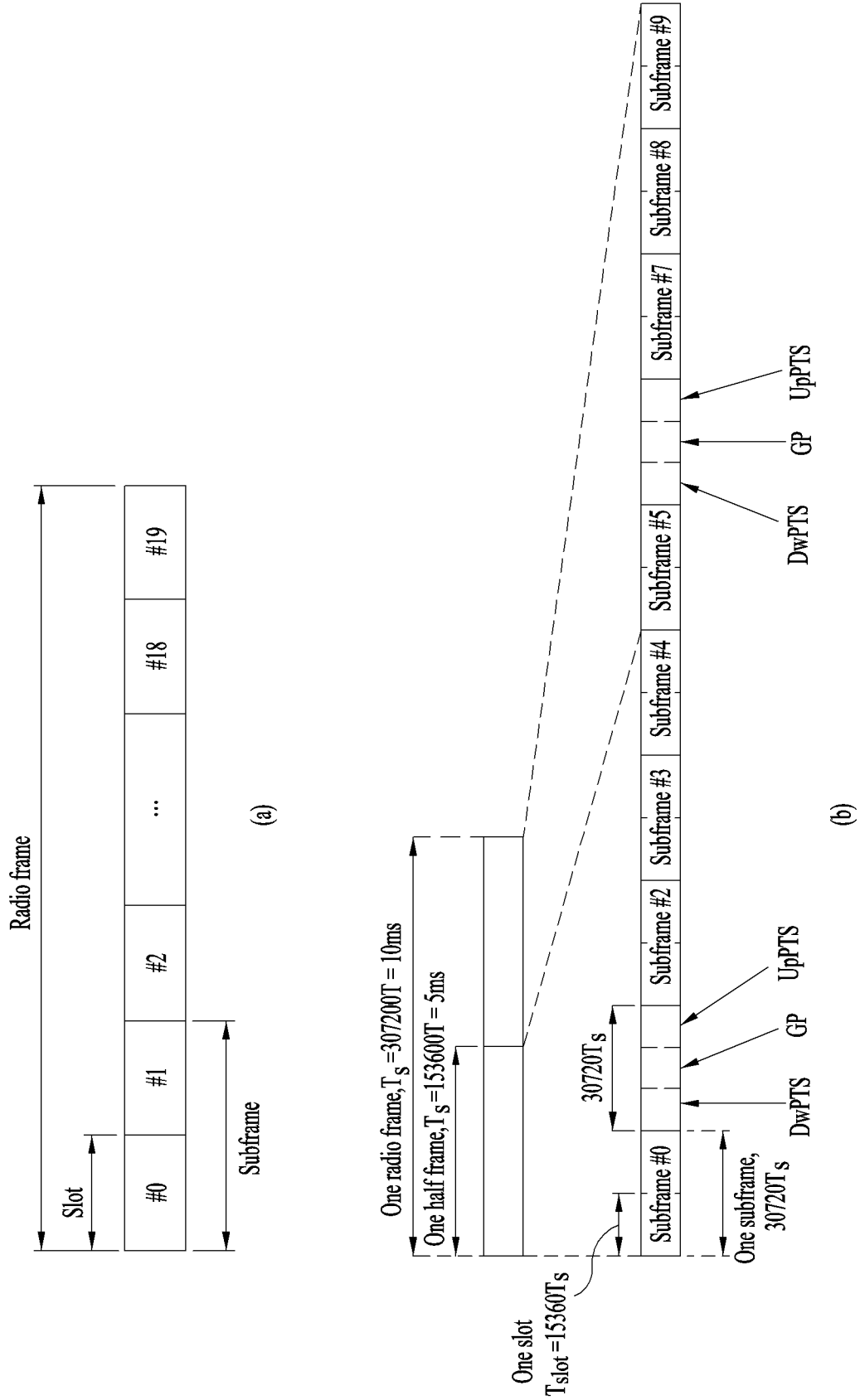
FIG. 4 is a diagram illustrating a structure of a radio frame used in a LTE system.

FIG. 4(*a*) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 4(*b*) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The current 3GPP standard document defines configuration of the special subframe as shown in Table 2 below. Table 2 shows DwPTS and UpPTS given when TS=1/(15000*2048), and the other region is configured as a GP.

TABLE 1

| | | Normal cyclic prefix in downlink | | Extended cyclic prefix in downlink | | |
|---|---|---|---|---|---|---|
| | | | UpPTS | | | UpPTS |
| | | Normal | Extended | | Normal cyclic | Extended cyclic |
| Special subframe configuration | DwPTS | cyclic prefix in uplink | cyclic prefix in uplink | DwPTS | prefix in uplink | prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the LTE TDD system, uplink/downlink subframe configurations (UL/DL configurations) are given as shown in Table 1 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe, and S denotes the special subframe. Table 1 also shows downlink-to-uplink switch-point periodicity in uplink/downlink subframe configuration of each system.

The structure of the above radio frame is just example. The number of a subframe, the number of slot included in a subframe or the number of symbol included in a slot included in the radio frame can be changed.

Figure 5:
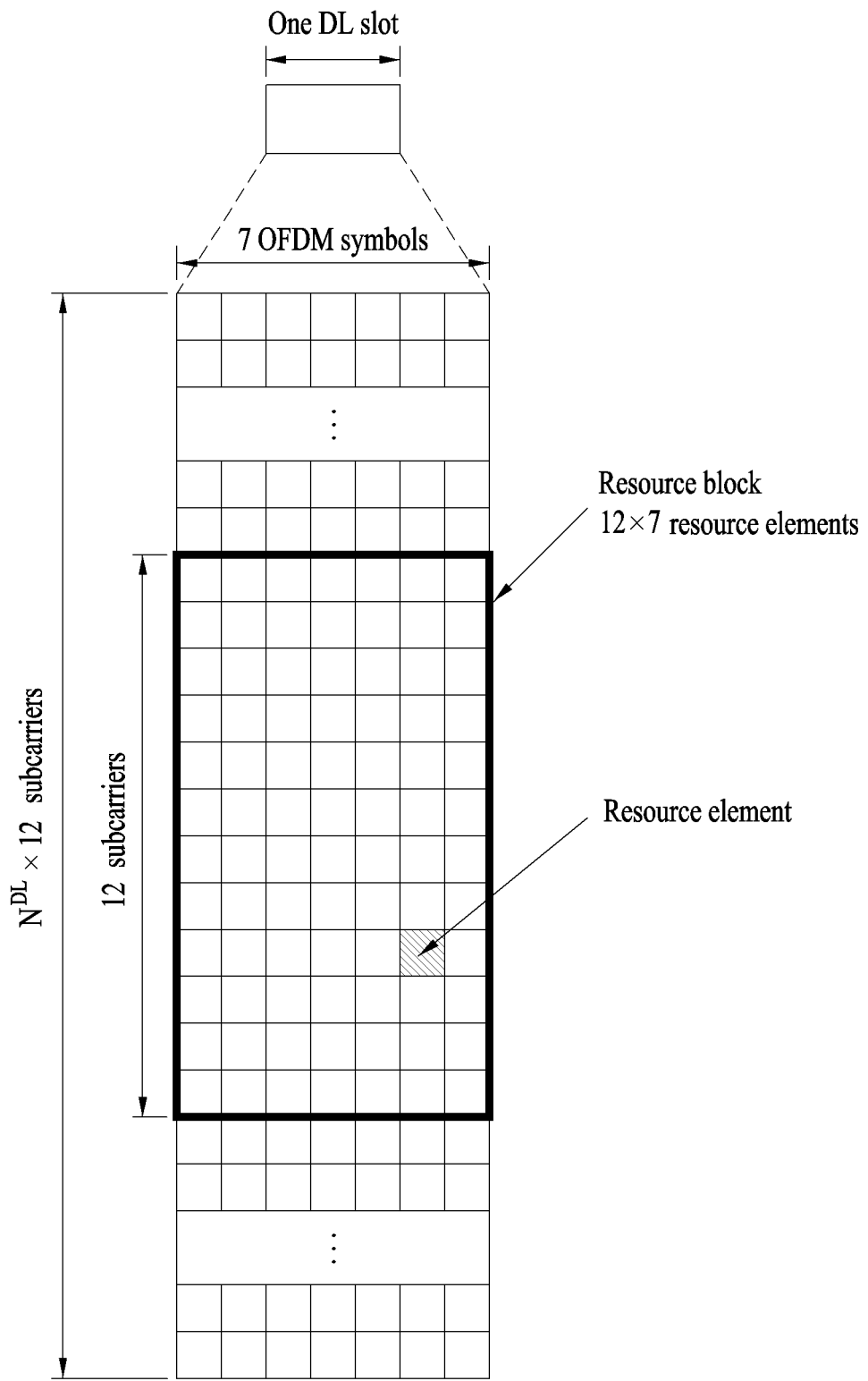
FIG. 5 is a diagram illustrating resource grid for downlink slot.

FIG. 5 is a diagram illustrating a resource grid for a downlink slot.

Referring to FIG. 5, a DL slot includes $N_{symb}^{DL}$ OFDM symbols in the time domain and $N_{RB}^{DL}$ resource blocks in the frequency domain. Since each resource block includes $N_{sc}^{RB}$ subcarriers, the DL slot includes $N_{RB}^{DL} \times N_{sc}^{RB}$ subcarriers in the frequency domain. Although FIG. 5 illustrates that the DL slot includes seven OFDM symbols and the resource block includes twelve subcarriers, it is to be understood that the downlink slot and the resource block are not limited thereto. For example, the number of OFDM symbols included in the downlink slot may be varied depending on a length of CP (cyclic prefix).

Each element on the resource grid is referred to as a resource element (RE). One resource element is indicated by one OFDM symbol index and one subcarrier index. One RB includes $N_{symb}^{DL} \times N_{sc}^{RB}$ number of REs. The number $N_{RB}^{DL}$ of RBs included in the DL slot depends on a DL transmission bandwidth configured in a cell.

Figure 6:
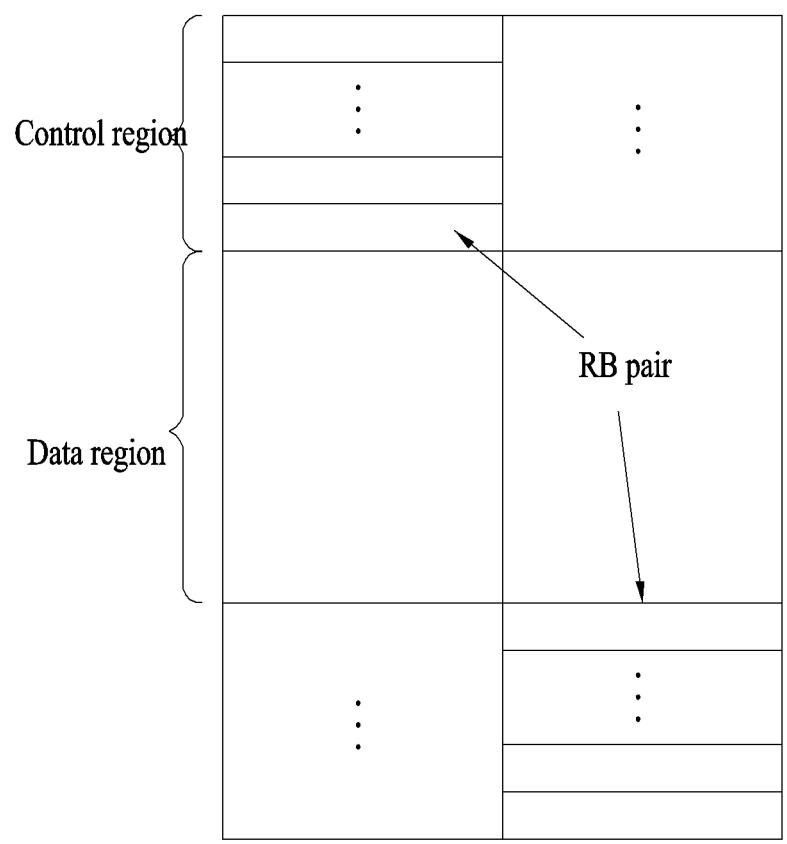
FIG. 6 is a diagram illustrating a structure of an uplink subframe.
Figure 6:
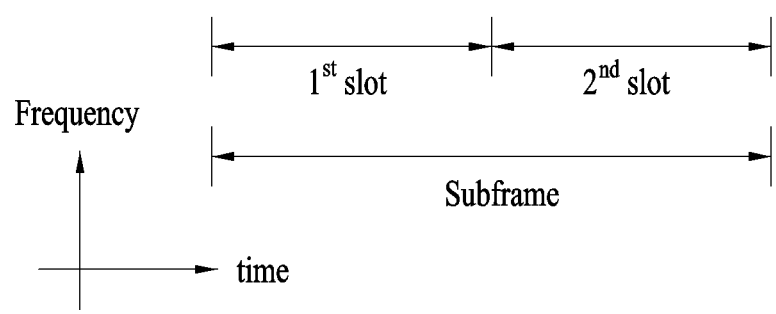

FIG. 6 illustrates a structure of an uplink subframe applicable to embodiments of the present invention.

Referring to FIG. 6, a UL subframe may be divided into a control region and a data region in the frequency domain. A PUCCH for carrying uplink control information is allocated to the control region and a PUSCH for carrying user data is allocated to the data region. In the LTE system, a UE does not simultaneously transmit the PUCCH and the PUSCH to maintain a single carrier property. However, in the LTE-A system, a PUCCH signal and a PUSCH signal can be simultaneously transmitted due to the introduction of carrier aggregation technology. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 7:
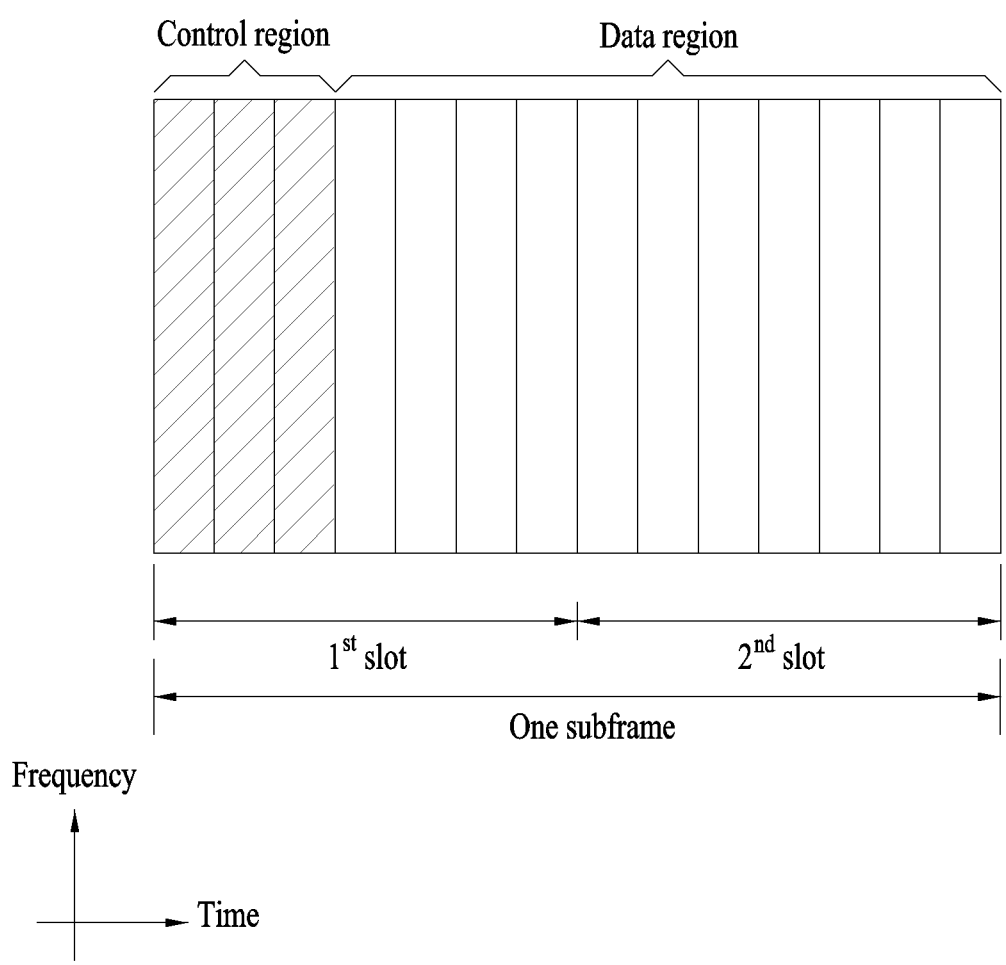
FIG. 7 is a diagram illustrating a structure of a downlink subframe used in LTE.

FIG. 7 is a diagram illustrating a structure of a downlink subframe applicable to embodiments of the present invention.

Referring to FIG. 7, a maximum of three OFDM symbols from OFDM symbol index #0 of a first slot in a subframe correspond to a control region to be assigned with a control channel. The remaining OFDM symbols correspond to a data region to be assigned with a PDSCH. Examples of downlink control channels used in the 3GPP LTE system includes a physical control format indicator channel (PCFICH), a physical downlink control channel (PDCCH), a physical hybrid ARQ indicator channel (PHICH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The RE indicates minimum physical resource defined as one subcarrier x one OFDM symbol. The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Synchronization Signal

Hereinafter, a synchronization signal will be described.

When a UE is powered on or newly attempts to access a cell, the UE may obtain time and frequency synchronization with the cell and perform a cell search procedure of detecting a physical layer cell identity (NcellID) of the cell. To this end, the UE may receive a synchronization, for example, a primary synchronization signal (PSS) and a secondary synchronization signal (SSS) from an eNB and synchronizes to its timing to the eNB to obtain information on a cell identity, and so on.

In detail, the PSS may be used as PSSd(n) by defining a Zadoff-Chu (ZC) sequence with a length 63 in the frequency domain according to Equation 1 below in order to acquire time domain synchronization and/or frequency domain synchronization such as OFDM symbol synchronization and slot synchronization.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In Equation 1 above, u is a ZC root sequence index and is defined in a current LTE system as shown in Table 3 below.

TABLE 3

| $N_{ID}^{(2)}$ | Root index u |
| --- | --- |
| 0 | 25 |
| 1 | 29 |
| 2 | 34 |

SSS may be used to obtain frame synchronization, a cell group ID, and/or cell CP configuration (i.e., usage information of normal CP or extension CP) and may be configured via interleaving combination of two binary sequences with a length 31. That is, the SSS sequence is d(0), . . . ,d(61) and has a total length of 62. The SSS sequence may be differently defined according to whether the sequence is transmitted in subframe #0 or #5 according to Equation 2 below. In Equation 2, n is an integer between 0 and 30.

$$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

[Equation 2]

In more detail, a synchronization signal may be transmitted in a first slot of subframe #0 and a first slot of subframe #5 in consideration of 4.6 ms that is a length of a global system for mobile communication (GSM) frame in order to easily measure inter radio access technology (RAT). In particular, the PSS may be transmitted in a last OFDM symbol of a first slot of subframe #0 and a last OFDM symbol of a first slot of subframe #5 and the SSS may be transmitted in the last OFDM symbol but one of a first slot of subframe #0 and the last OFDM symbol but one of a first slot of subframe #5. A boundary of a corresponding wireless frame may be detected through the SSS. The PSS may be transmitted in the last OFDM symbol of a corresponding slot and the SSS may be transmitted in an OFDM symbol immediately before the PSS.

SS may indicate a total of 504 unique physical layer cell IDs via a combination of three PSSs and 168 SSs. In other words, the physical layer cell IDs may be grouped into 168 physical-layer cell-identity groups, each of which includes three unique identities, such that each physical layer cell ID is a portion of only one physical-layer cell-identity group. Accordingly, the physical layer cell identify NcellID may be uniquely defined by number N(1)ID in a range of 0 to 167 indicating a physical-layer cell-identity and number N(2)ID of 0 to 2 indicating the physical-layer identify in the physical-layer cell-identity. A UE may detect the PSS to recognize one of three unique physical-layer identifiers and detect the SSS to identify one of 168 physical layer cell IDs associated with the physical-layer identity.

The PSS may be transmitted every 5 ms and, thus, the UE may detect the PSS to recognize a corresponding subframe as one of subframe #0 and subframe #5 but may not know in detail whether the corresponding subframe is subframe #0 or subframe #5. Accordingly, the UE may not recognize a boundary of a radio frame using only the PSS. That is, frame synchronization may not be acquired using only the PSS. The UE may detect the SSS that is transmitted twice in one radio frame and transmitted as different sequences and detect a boundary of a radio frame.

As such, for cell search/re-search, the UE may receive the PSS and the SSS from the eNB and synchronize its timing to the eNB to acquire information on a cell identify (ID) and so on. Then, the UE may receive broadcast information in a cell managed by the eNB on a PBCH.

Device to Device (D2D) Communication

When D2D communication is applied to the aforementioned wireless communication system (e.g., 3GPP LTE system or 3GPP LTE-A system), a detailed method for performing D2D communication will be described below.

Hereinafter, a communication environment between devices according to the present invention will be described briefly.

D2D communication literally refers to communication between electronic devices. In a broad sense, D2D communication refers to wired or wireless communication between electronic devices or communication between a machine and a device controlled by the human. Recently, in general, D2D communication refers to wireless communication between electronic devices, which is performed irrespective of the human.

Figure 8:
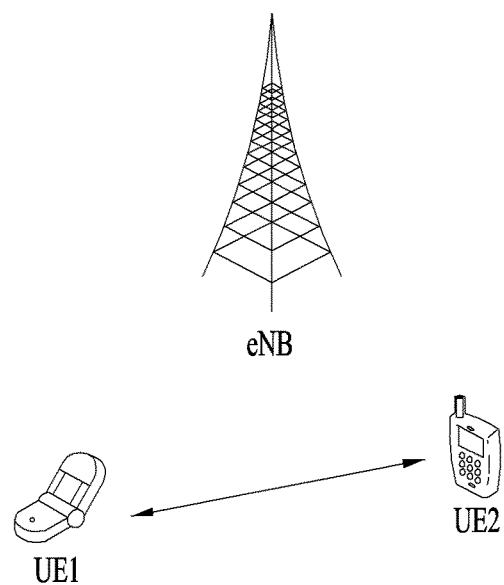
FIG. 8 is a diagram illustrating a communication system applicable to the present invention.

FIG. 8 is a diagram for explanation of a concept of D2D communication. FIG. 8 illustrates D2D or UE-to-UE communication method as an example of D2D communication and data exchange between UEs may be performed without passing through an eNB. As such, link that is directly established between devices may be referred to as a D2D link or a side link. D2D communication advantageously has low latency and requires a small amount of radio resources compared with a conventional eNB-centered communication method. Here, the UE refers to a user terminal but may be considered as a kind of UE when network equipment such as an eNB transmits and receives a signal according to a communication method between UEs.

In order to perform D2D communication, two UEs need to acquire time and frequency synchronization therebetween. In general, when two UEs are within coverage of the eNB, two UEs may be synchronized with PSS/SSS, CRS, or the like transmitted from an eNB and time/frequency synchronization may be maintained in a level in which signals are capable of being transmitted and received directly between the two UEs. Here, a synchronization signal for D2D communication is referred to as a D2D synchronization signal (D2DSS). A UE that is synchronized with a specific eNB may transmit a D2DSS based on eNB synchronization. The D2DSS may be a D2D signal transmitted in order to form synchronization with another UE by a UE and another UE may detect the D2DSS so as to acquire synchronization with the corresponding UE. In particular, in the case of a UE present outside coverage of an eNB to which the corresponding UE synchronizes its timing (that is, in the case of a UE that is connected to another eNB or is not connected to any eNB), synchronization may be acquired through this operation. The D2DSS may include a signal such as PSS/SSS of an LTE system. As such, PSS/SSS (or modified signal of PSS/SSS) transmitted for D2D communication is referred to as a primary D2D synchronization signal (PD2DSS) and a secondary D2D synchronization signal (SD2DSS). The PD2DSS may be used to acquire schematic timing and based on a ZC sequence like PSS of an LTE system. In addition, the SD2DSS may be used for more accurate synchronization and based on an m-sequence like SSS of an LTE system. A physical D2D synchronization channel (PD2DSCH) may refer to a physical channel for carrying information required for synchronization, such as a system bandwidth, a radio frame, and a subframe index.

A UE outside coverage of an eNB may also transmit D2DSS and may allow another UE to synchronize its timing to the UE. The UE may pre-set a type of D2DSS used according to a state of coverage of a transmission UE of D2DSS in order to allow a UE that detects D2DSS to differentiate whether the corresponding D2DSS is caused from a UE inside coverage of the eNB or a UE outside the coverage of the eNB.

The aforementioned D2D synchronizing method may give priority to synchronization provided by a network. In more detail, a UE may most preferentially select a synchronization signal transmitted directly by the eNB in order to determine transmission synchronization of the UE and when the UE is outside coverage of the eNB, D2DSS transmitted by a UE within coverage of the eNB is preferentially synchronized. According to this principle, a UE may synchronize timing provided by a network if possible and a D2D operation may be smoothly multiplexed with an existing network operation (a transmission and reception operation between an eNB and a UE). For example, one subframe performs an existing network operation and a next subframe performs D2D.

On the other hand, the aforementioned conventional D2D synchronization method is determined to preferentially use network timing and, thus, a UE needs to frequently change synchronization according to a network situation and there is the possibility that synchronization acquisition fails during this procedure. In detail, a UE determines timing of D2D signal transmission based on synchronization with a serving cell and, thus, when the UE may be moved and a serving cell is changed, time synchronization may also be changed and a transmission UE may convert timing and predetermined latency for re-recognizing the converted timing by a reception UE during this procedure. In particular, transmission and reception UEs lose synchronization therebetween during the latency and, thus, temporary D2D transmission and reception may not be possible.

When adjacent cells are not time-synchronized, a UE of one cell needs to maintain a plurality of synchronizations while separately tracking timing of each cell in order to receive a D2D signal of a UE of another cell and D2DSS transmission for synchronization for each cell may have a relatively long period due to a problem due to the overhead. For example, D2DSS transmission may have a period of minimum 40 ms, which correspond to a very long period compared with 5 ms at which an eNB transmits PSS/SSS. Accordingly, as a D2DSS transmission period is increased, the possibility that synchronization performance using D2DSS is reduced is high and latency of time for D2D synchronization time may be caused.

Hereinafter, according to the present invention, a method of more rapidly forming D2D synchronization when D2D UEs already have an external synchronization source separated from a source provided by a network by employing an external synchronization source in order to overcome a problem in terms of a D2D synchronization procedure will be described. For convenience of description, a device for transmitting an existing synchronization signal to a UE, for example, a device for transmitting a synchronization signal to a UE or synchronized with the UE according to an existing synchronization procedure or a device for transmitting a D2D synchronization signal to a corresponding UE or synchronized with the UE will be referred to as a first type device and an external synchronization source will be referred to as a second type device. A conventional D2D synchronization method is referred to as a first synchronization mode and a new D2D synchronization method using a second type device is referred to as a second synchronization mode.

Here, the first type device may be an eNB (or network), a D2D terminal, or the like and a representative second type device may be a global positioning system (GPS). For example, it is assumed that a UE using the second synchronization mode includes a GPS receiver installed therein and acquires time synchronization based on a signal provided by a GPS satellite. However, the second type device is not limited to a device such as GPS. As necessary, an eNB other than the first type device may correspond to the second type device as necessary.

Figure 9:
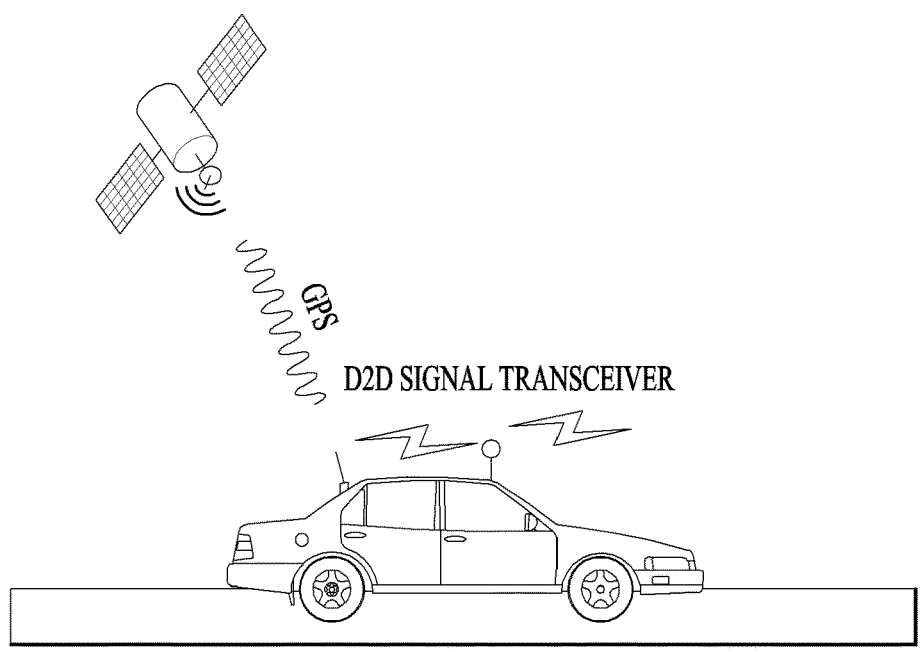
FIG. 9 is a diagram illustrating an example of an environment to which a synchronization acquiring method according to the present invention is applicable.

FIG. 9 is a diagram illustrating an example of an environment to which a synchronization acquiring method according to the present invention is applicable.

In particular, as illustrated in FIG. 9, a UE installed in a vehicle may always drive a GPS receiver without worry about battery consumption and the possibility that the UE already drives a GPS receiver for a purpose other than D2D communication, for example, a purpose of a navigation device in the case of a vehicle is high and, thus, the UE may be appropriate to use the second synchronization mode. In the case of a shadow area such as a tunnel in which a GPS signal is not capable of being received from a satellite, equipment for relaying a GPS signal may be installed so as to continuously provide the second type device.

Hereinafter, detailed methods of executing the proposed second synchronization mode will be described.

In order to execute the second synchronization mode, a second type device may be required. In this regard, some UEs may not originally execute this function for the reason of complexity for embodying a UE, battery consumption, or the like or even if this function is embodied, the function may not be temporally used. Accordingly, in order to execute the second synchronization mode, an eNB needs to recognize whether a separate UE has capability for executing the second synchronization mode. The UE may transmit information on whether the corresponding UE has capability for executing the second synchronization mode and/or whether the UE currently executes the first and second synchronization modes as information on capability to the eNB.

The eNB may perform an appropriate operation based on the information. For example, the eNB may adjust the amount of resources for corresponding synchronization-based D2D, based on the number of UEs that execute the second synchronization mode. In addition, for example, the eNB may recognize that a UE that executes the second synchronization mode is capable of performing D2D with a different subframe boundary from network timing by a first type device and reflect the recognition result to uplink scheduling, as described later. In general, the second synchronization mode is more complex than the first synchronization mode and, thus, a UE that is capable of executing the second synchronization mode may be defined to execute the first synchronization mode.

The first type device (e.g., eNB) may notify the UE of the second synchronization mode and whether D2D signal transmission is permitted according to the second synchronization mode within coverage the first type device. In this case, whether D2D signal transmission is permitted according to the second synchronization mode, to all UEs. Here, the first type device may transmit information on a synchronization mode indicating the first synchronization mode or the second synchronization mode to a UE. For example, when many UEs that transmit to a specific cell a D2D signal according to a second synchronization mode are distributed, if frequent transmission of corresponding UEs is not matched with cell synchronization and collision with uplink transmission is determined to occur with the high possibility, an eNB may indicate that a D2D signal is transmitted in a corresponding cell according to the first synchronization mode. That is, D2D signal transmission according to the second synchronization mode may be indicated to be stopped or prevented.

When D2D signal transmission according to the second synchronization mode is permitted, resources to be used in a second synchronization mode and D2D signal transmission according thereto may also be broadcast. In this case, the first type device may transmit resource allocation information including information indicating resources for receiving a synchronization signal from the second type device. Similarly, the first type device may transmit information indicating a resource for transmitting a D2D signal according to the second synchronization mode to a UE. However, as described later, a resource for transmitting a D2D signal according to the second synchronization mode may be preset based on a specific time point. Here, as described later, when the second synchronization mode, a boundary of the subframe (hereinafter, the subframe boundary by the second type device) may not be matched with a subframe boundary at network timing and, thus, only a frequency resource may be determined, Needless to say, when a network synchronizes its timing with a second type device, a time resource may also be determined.

Figure 10:
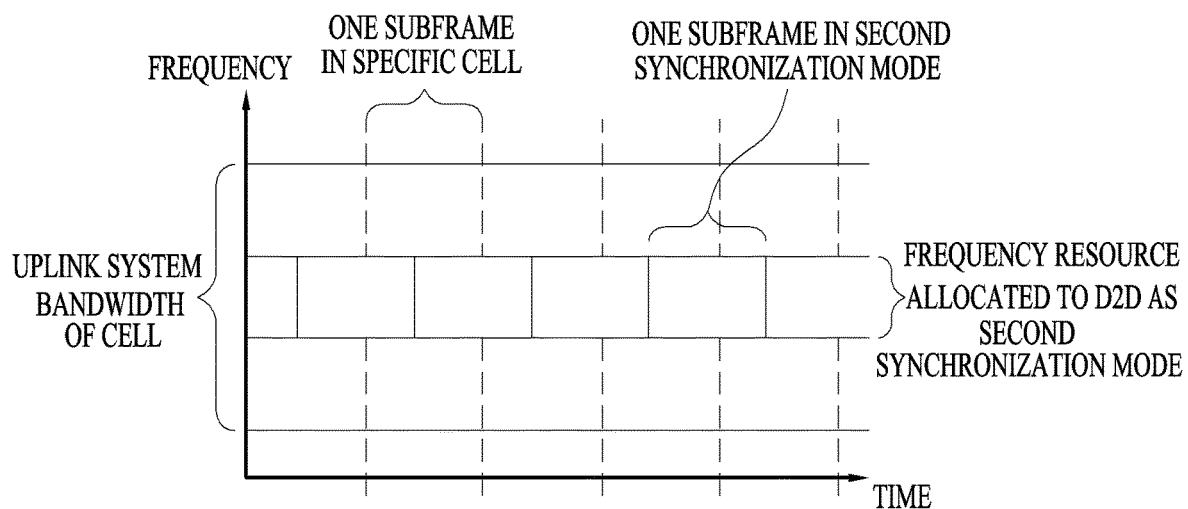
FIG. 10 is a diagram illustrating an example of determining a resource according to the present invention.

FIG. 10 is a diagram illustrating an example of determining a second synchronization mode and/or D2D signal transmission according to thereto in a specific ell. Here, it is assumed that a network does not have a second type device and, thus, a subframe boundary defined by the second synchronization mode is not matched with a boundary defined by an eNB. Referring to FIG. 10, the specific ell may set a resource to be used in the second synchronization mode and/or D2D signal transmission according thereto by a UE in an uplink band of the specific cell.

Figure 11:
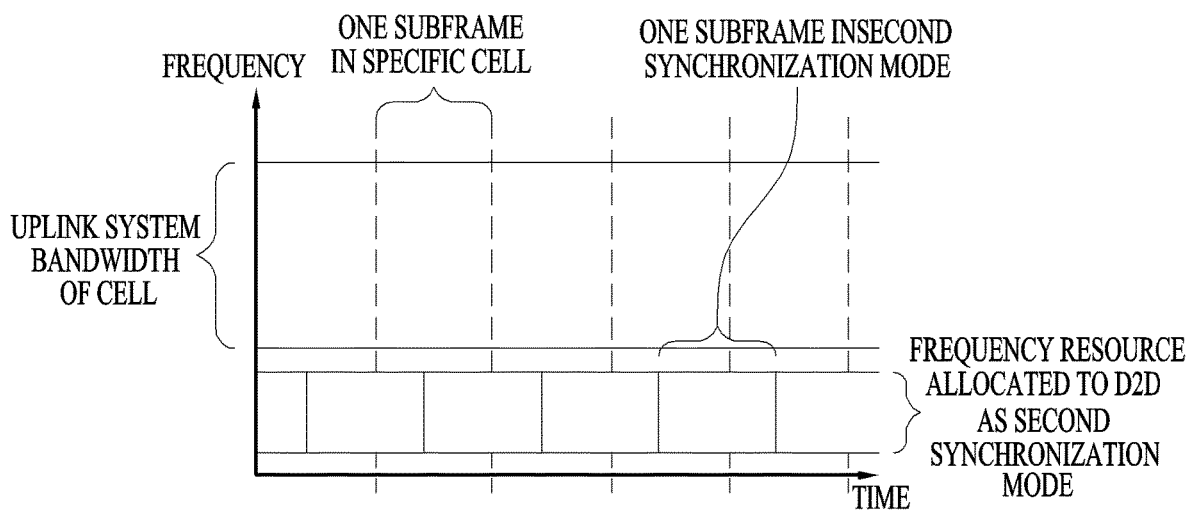
FIG. 11 is a diagram illustrating another example of determining a resource according to the present invention.

FIG. 11 also illustrates an example of determining a resource to be used in a second synchronization mode and/or D2D signal transmission in a specific cell and indicates resource allocation to FIG. 10. Here, specifically, a resource to be used in the second synchronization mode and/or D2D signal transmission according to thereto are set outside an uplink band. In particular, this setting may be useful when the second synchronization mode is not matched with uplink and thus it is difficult to perform multiplexing together. In this case, in terms of a UE that attempts to operate in the second synchronization mode, a resource of a second synchronization mode is indicated outside a bandwidth of an uplink cell associated with a cell for determining a resource of the second synchronization mode through a specific downlink link cell, in particular, downlink. Although not illustrated in FIG. 11, resources to be used in the second synchronization mode and/or D2D signal transmission according to thereto are positioned outside both opposite sides of a bandwidth of an uplink cell and constitute two frequency subregions that are spaced apart from each other. Here, a D2D channel may be transmitted by hopping the two frequency subregions so as to acquire frequency diversity.

Hereinafter, a method of acquiring synchronization when a D2D UE uses a second synchronization mode will be described.

First, in the case of time synchronization, all UEs may be deemed to be synchronized with each other based on the aforementioned second type device. Accordingly, a D2D subframe boundary when a second synchronization mode is used in a predetermined time unit based on a specific time point in a time defined by the second type device may be determined. Here, the specific time point as reference may be pre-input to UEs. Hereinafter, the specific time point will be referred to as an external synchronization reference. In addition, the predetermined time unit may also be pre-set and, for example, the D2D subframe boundary may be set to be determined in a unit of 1 ms. Accordingly, a UE that uses the second synchronization mode may pre-acquire time synchronization including one subframe boundary connected to the second type device. Accordingly, the UE may recognize start and end points as a specific D2D subframe without a separate synchronization procedure and transmit or receive a D2D signal according to the recognition result.

When different D2D signals are transmitted according to time, when and which signal is transmitted may be predetermined. For example, when a subframe is determined using the aforementioned method, where D2DSS is transmitted may also be determined.

In order to acquire frequency synchronization of a D2D signal, the following method may be used. As one method, similarly to signal synchronization, a method of generating a reference signal of frequency synchronization using a second type device may be used. However, in this case, it may be general to require a separate device. In particular, a radio frequency of radio signal transmission and reception is variously indicated according to network configuration and, thus, a device for guiding various frequency synchronization reference signals from the second type device may have relatively high cost. On the other hand, frequency synchronization does not conclusively affect an operation compared with time synchronization despite slight error and simply and slightly degrade performance and, thus, it may not be necessary to guide frequency synchronization from the second type device. In this case, as a second method, time synchronization may be guided from the second type device and frequency synchronization may be guide from a network, as described above. In particular, the UE needs to acquire frequency synchronization of a network in order to transmit a signal to an eNB and, thus, when the frequency synchronization is re-used, synchronization may be completed without separation complex embodiment. In addition, dynamic conversion is not advantageously necessary as a method of synchronizing a frequency of a transmission signal with a frequency of the eNB at a specific time at an uplink band during uplink transmission and guiding a frequency of a transmission signal from a second type device at a different time point. Hereinafter, a method of acquiring frequency synchronization for D2D transmission will be described in more detail.

Figure 12:
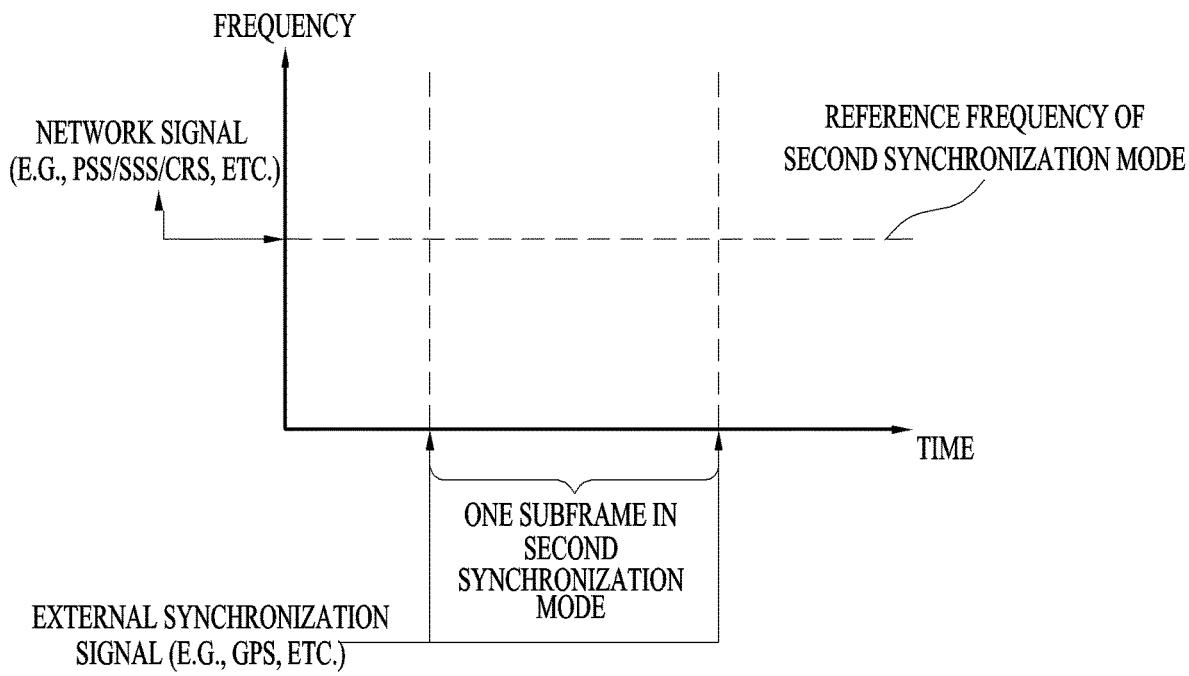
FIG. 12 is a diagram illustrating a concept of an operation of acquiring synchronization according to an embodiment of the present invention.

FIG. 12 is a diagram illustrating a concept of an operation of acquiring time synchronization from a second type device and acquiring frequency synchronization from a network according to an embodiment of the present invention.

As illustrated in FIG. 12, when frequency synchronization is guided from a network in the second synchronization mode, it may be still necessary to transmit D2DSS for synchronization with a UE outside coverage of a network. However, the UE outside coverage of a network also recognizes time synchronization using the second type device and, thus, the UE may directly attempt D2DSS in a subframe defined according thereto. As a result, a procedure of acquiring time synchronization using D2DSS may be omitted and time latency due to detection error may be remarkably reduced.

With regard to the feature of D2DSS used in the second synchronization mode, it may not be necessary to acquire time synchronization through the D2DSS and, thus, the frequency position may be more flexible than in the first synchronization mode. Only a center frequency region of an uplink bandwidth is determined to be used by D2DSS in the first synchronization mode and, thus, when a UE first acquires time synchronization, a position in a frequency resource may be fixed to easily acquire synchronization but this limit may not be necessary in the second synchronization mode. That is, D2DSS of the second synchronization mode may be permitted to be transmitted even if a current region is not a center region of an uplink bandwidth.

However, in order to exclude excessively high possibility, candidates of frequency resources for transmitting D2DSS may be limited to a predetermined number. Alternatively, in the case of the second synchronization mode, even UEs positioned in a different cell maintain the same synchronization and, thus, all UEs in a network transmit and receive the same D2DSS with a transmission resource and transmission sequence of a single D2DSS. However, when all UEs simultaneously transmit the D2DSS, there is no change to receive the D2DSS and, thus, each UE may stochastically transmit every D2DSS transmission time point. In this case, in order to prevent only D2DSS from being continuously transmitted or received, when the D2DSS is transmitted once, the possibility of next transmission may be reduced. Alternatively, when the D2DSS is not transmitted once, the possibility of next transmission may be increased.

D2DSS of the second synchronization mode with this attribute needs to be differentiated from D2DSS of the first synchronization mode and, thus, different sequences may be used in the first synchronization mode and the second synchronization mode. That is, a sequence that is not used in the D2DSS of the first synchronization mode may be used. For example, a number other than a sequence generation root index that has been used to generate the first synchronization mode D2DSS may be used as a root index for generation of the second synchronization mode D2DSS.

Accordingly, various parameters of a D2D data channel based on the second synchronization mode may be differently set from the case based on the first synchronization mode so as to differentiate two cases. For example, a DMRS sequence formation parameter and/or a D2D data channel scrambling sequence formation parameter and/or a CRC mask for a D2D data channel may be differently set.

Hereinafter, a D2D transmission scheduling method when the second synchronization mode is used will be described.

First, it is difficult to simultaneously transmit data to D2D at the same time by one UE because an uplink transmission signal of LTE basically is determined to occupy consecutive RBs. Accordingly, when D2D signal transmission and signal transmission to an eNB collide with each other at the same time, only one of these needs to be transmitted. Existing D2D is designed to apply priority to signal transmission to an eNB and to stop D2D signal transmission. However, in the case of D2D using the aforementioned second synchronization mode, a very emergent signal needs to be rapidly transmitted for D2D and, thus, in the case of at last one some of emergent D2D signals, signal transmission to an eNB may be stopped and D2D may be transmitted.

In detail, when a signal to the first type device and a signal to a counterpart terminal of D2D are simultaneously scheduled in a period in which the second synchronization is applied, a signal to the counterpart terminal may have priority to a signal (signal between eNB and UE) to the first type device.

This differentiation may be performed in a subframe unit defined by, in particular, the second type device. For example, D2D transmission in a specific subframe set has priority to signal transmission to an eNB but D2D transmission in the other subframe sets may have priority to signal transmission to an eNB.

As illustrated in FIGS. 10 and 11, a subframe used by an eNB and a subframe used in the second synchronization mode may have boundaries that are not matched with each other. Accordingly, it is difficult to alternately perform signal transmission to an eNB and D2D signal transmission and reception in a subframe unit.

As one method for overcoming this issue, during scheduling of transmitting a signal to an eNB, the eNB may continuously empty at least two subframes, that is, the eNB may perform scheduling such that the corresponding UE may not transmit any uplink signal in the two subframes to indicate one complete D2D subframe irrespective of a subframe boundary in at least one subframe. The UE may use the consecutive empty subframes to receive a D2D signal of another UE or transmit a D2D signal of the UE as necessary.

For example, when uplink grant is not included in a downlink signal transmitted in a specific subframe, the UE may perform communication between UEs in an uplink subframe corresponding to the specific subframe and perform communication between UEs in at least one subframe subsequent to the specific subframe. For example, when PUSCH transmission of UL grant received in DL subframe n to an eNB is performed in UL subframe n+4, if the UE is not capable of receiving any UL grant in DL subframe n, the UE may recognize that any signal is not transmitted to an eNB in UL subframe n+4 and transmit a D2D signal using D2D subframe k started at a middle portion of UL subframe n+4 at a network timing. However, in this case, it may be assumed that the eNB may not transmit UL grant in DL subframe n+1 and may also empty UL subframe n+5.

Figure 13:
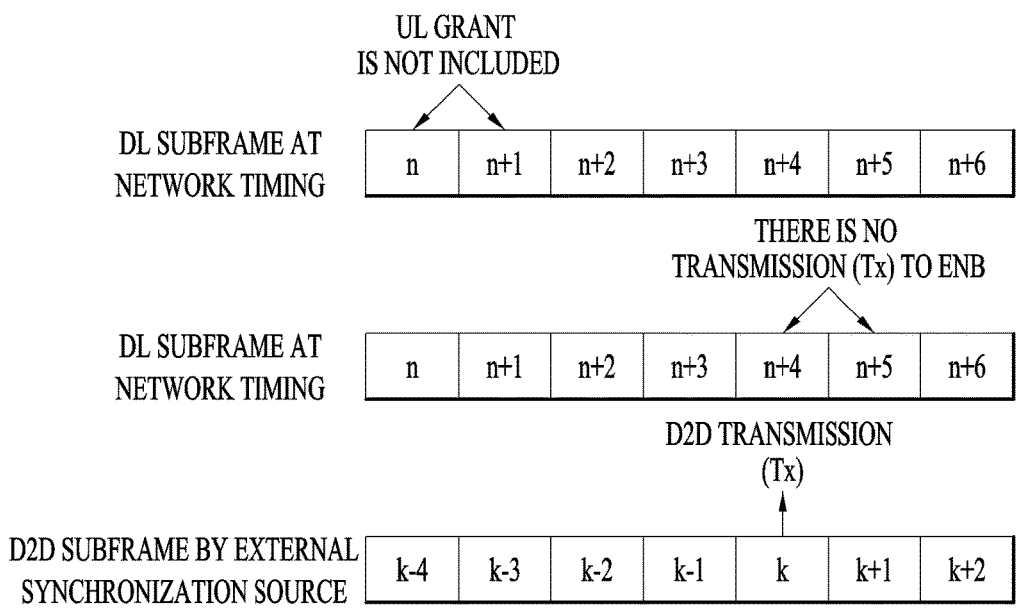
FIG. 13 is a diagram illustrating an uplink scheduling method for a D2D operation according to the present invention.

FIG. 13 is a diagram illustrating an uplink scheduling method for a D2D operation according to the present invention.

In order to more smoothly transmit a D2D signal based on the assumption by a UE, an eNB may notify the UE of information on a subframe in which UL transmission is not scheduled. Then, the UE may preferentially use a subframe that is not known to be scheduled to transmit a D2D signal.

In the case of the aforementioned operation, an eNB that schedules uplink of WAN communication between an eNB and a UE may not know a subframe of a UE in which WAN transmission and D2D transmission overlap each other. When WAN transmission and D2D transmission overlap each other, even if two signals use different frequency resources, there may be no limit in that only one of two signals is transmitted according to capability of a UE. For example, a UE that has no function of transmitting a signal using inconsecutive subcarriers may transmit only one of the two signals. In this case, when D2D transmission is prioritized, WAN transmission may be dropped to degrade WAN performance. In particular, when the dropped WAN transmission is a HARQ-ACK signal of PDSCH, HARQ-ACK is not capable of being simply transmitted and, thus, there is a problem in that PDSCH is unnecessarily re-transmitted to waste resources.

Hereinafter, in order to overcome this problem, uplink scheduling of an eNB in the case of HARQ-ACK transmission will be described.

To overcome this problem, HARQ-ACK of PDSCH transmitted in one subframe may be designed to be transmitted in at least one subframe of a plurality of UL subframes.

In the case of an existing LTE FDD, HARQ-ACK of PDSCH received in subframe #n may be transmitted in subframe #n+4. In this situation, when D2D transmission collides with HARQ-ACK transmission in a portion of subframe #n+4, it is difficult that the eNB knows whether PDSCH in subframe #n is successfully received. In this case, the HARQ timeline may be adjusted and, for example, HARQ-ACK of PDSCH received in subframe #n may be determined to be transmitted subframe #n+4 and subframe #n+6.

Specifically, a plurality of subframes for transmitting HARQ-ACK of PDSCH in one subframe are inconsecutive in order to prevent simultaneous collision between D2D transmission in one subframe with a mismatched with a subframe boundary and HARQ-ACK in two consecutive subframes. Accordingly, even if HARQ-ACK transmission in subframe #n+4 is dropped due to collision with D2D transmission, when it is possible to transmit HARQ-ACK in subframe #n+6, the problem in terms of waste in PDSCH resources may be overcome. D2D resource may be appropriately configured to prevent HARQ-ACK transmission from being entirely dropped due to collision with D2D transmission. In detail, a subframe corresponding to a predetermined time period in an external synchronization reference may be configured as a D2D transmission subframe and a subframe corresponding to a specific subsequent time period may not be configured as a D2D transmission subframe. For example, when a subframe corresponding to 1 ms in an external synchronization reference may be configured as a D2D transmission subframe and at least subsequent 3 ms is not configured as a D2D transmission subframe from the same UE, both subframe #n+4 and subframe #n+6 may not be dropped due to collision between HARQ-ACK transmission and D2D transmission in the aforementioned example.

Figure 14:
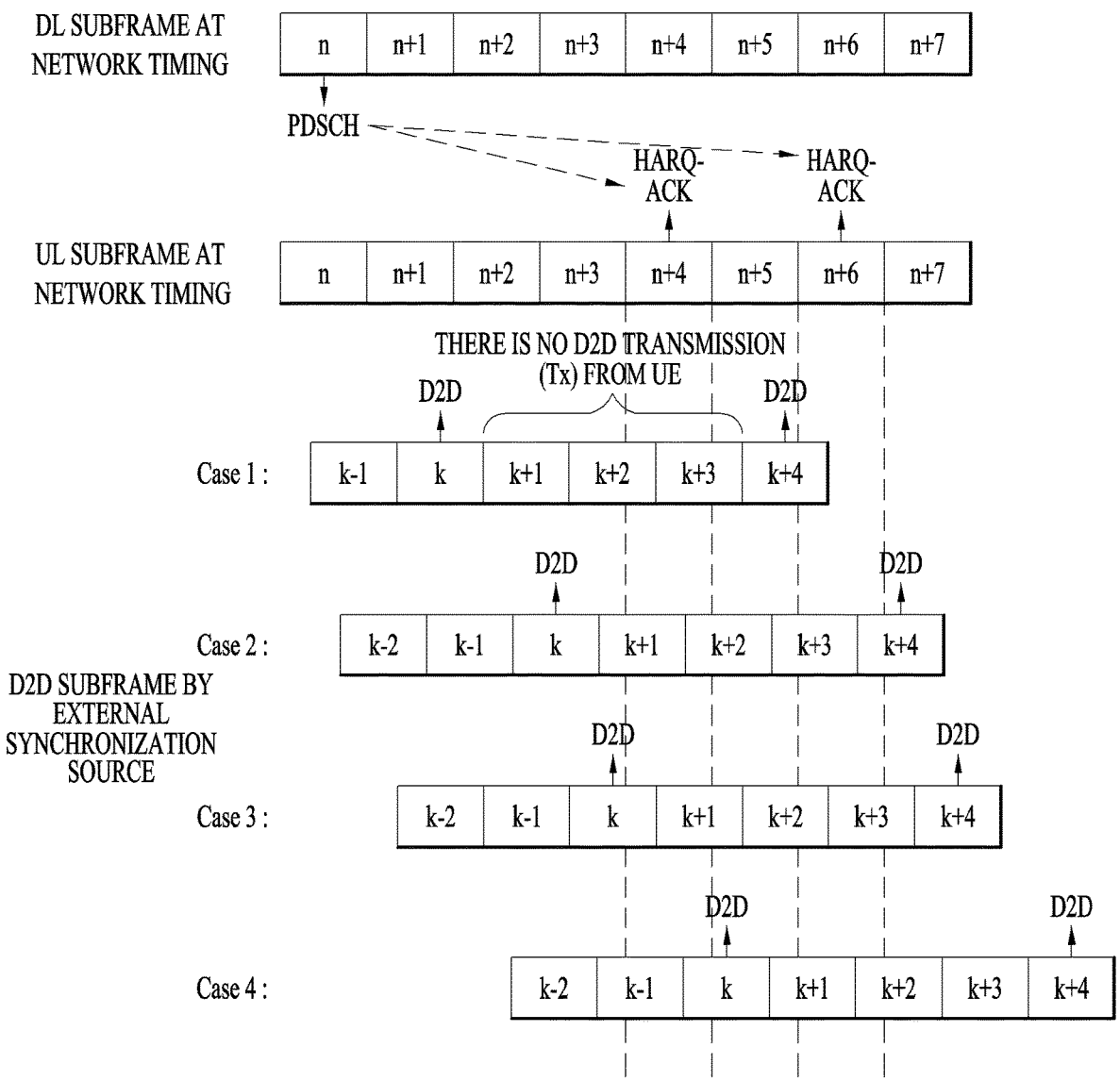
FIG. 14 is a diagram illustrating uplink scheduling of an eNB in consideration of HARQ-ACK transmission according to the present invention.

FIG. 14 is a diagram illustrating uplink scheduling of an eNB in consideration of HARQ-ACK transmission according to the present invention.

Here, it is assumed that external reference subframe #k and subframe #k+4 are used to transmit D2D of a single UE and a gap of 3 ms is present between the subframes. Referring to FIG. 14, Case 1, 2, 3, and 4 correspond to the case in which a rear portion of subframe #k+4 collide with a front portion of subframe #n+6, the case in which a front portion of subframe #k+4 collides with a rear portion of subframe #n+6, the case in which a rear portion of subframe #k collides with the front portion of subframe #n+4, and the case in which a front portion of subframe #k collides with a rear portion of subframe #n+4. Referring to FIG. 14, in any case, HARQ-ACK transmission in both subframe #n+4 and subframe #n+6 may not collide. Needless to say, some time periods may be configured as a gap without transmission in the D2D subframe or the WAN subframe.

When HARQ-ACK of one PDSCH is transmitted in a plurality of subframes, a transmitting operation of a UE will be described below in more detail.

First, when HARQ-ACK transmission is not dropped in a subframe (subframe #n+4 of FIG. 14) for transmitting HARQ-ACK, the possibility that HARQ-ACK will be dropped needs to be considered and, thus, HARQ-ACK needs to be transmitted. However, when HARQ-ACK is first transmitted and then it is possible to re-transmit HARQ-ACK in a subframe (subframe #n+6 of FIG. 14), one of the following two methods may be used.

Previous transmission of HARQ-ACK may be configured to be sufficient and corresponding HARQ-ACK in a corresponding subframe may not be transmitted. Accordingly, a WAN transmissions bit number in the corresponding subframe may be reduced and, thus, transmission power of another WAN signal may be reduced or coverage may be increased.

Error may occur in previous transmission of HARQ-ACK and, thus, transmission may be performed as long as a signal is not still dropped in subframe #n+6. The eNB may combine HARQ-ACK over a plurality of subframes and attempt to receive HARQ-ACK with relatively high reliability.

Figure 15:
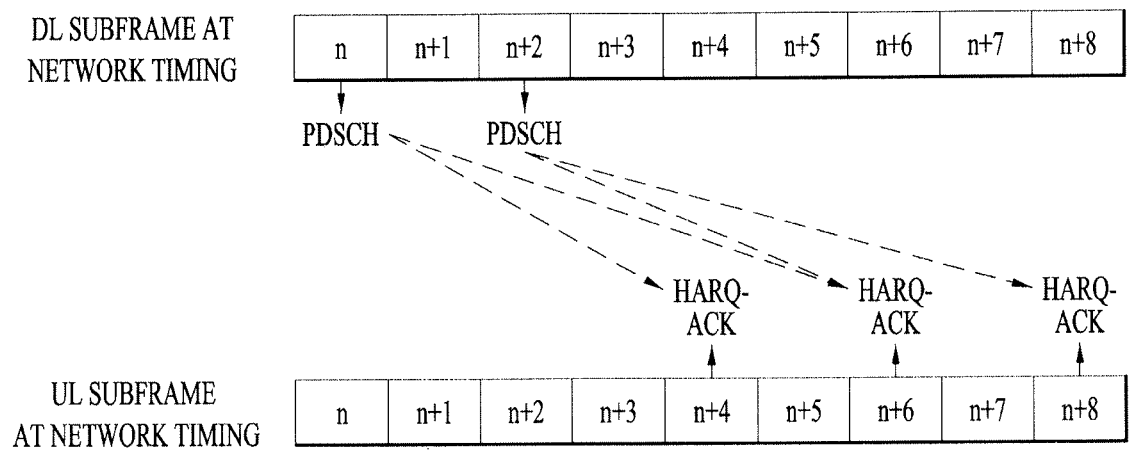
FIG. 15 is a diagram illustrating an example illustrating HARQ-ACK transmission according to uplink scheduling.

When this principle is applied, HARQ-ACK corresponding to PDSCH with respect to a plurality of subframes in one subframe needs to be frequently transmitted together. FIG. 15 is a diagram illustrating an example illustrating HARQ-ACK transmission according to uplink scheduling. Referring to FIG. 15, in subframe #n+6, HARQ-ACK in subframe #n and subframe #n+2 needs to be transmitted together.

The aforementioned present invention may be generalized and applied as the case in which the second type device is not a cell that is positioned in a carrier for transmitting a D2D signal. For example, when timing is acquired from a cell positioned in another carrier but not the carrier for transmitting a D2D signal and the D2D signal is transmitted, asynchronization may occur between a D2D transmission subframe and a WAN transmission subframe and, in this case, the present invention may be applied to overcome the same problem. The cell position in another carrier but not the carrier for transmitting the D2D signal may be, for example, an adjacent cell except for a serving cell. The adjacent cell may be useful in the case in which it is difficult to acquire synchronization from a source GPS when a UE is positioned in a tunnel or the like.

Figure 16:
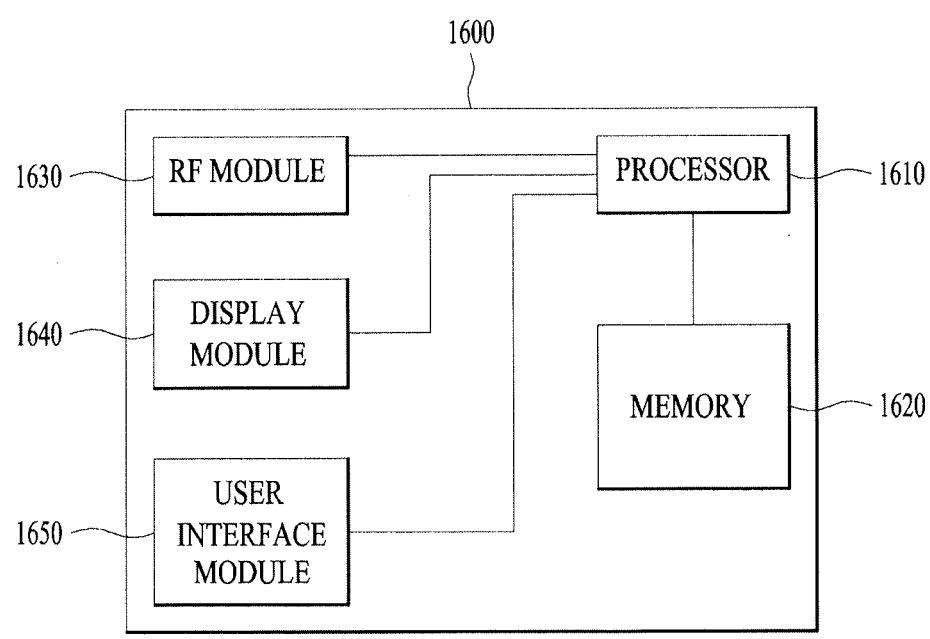
FIG. 16 is a block diagram of a communication device according to an embodiment of the present invention.

FIG. 16 is a block diagram of a communication device 1600 according to an embodiment of the present invention.

Referring to FIG. 16, the communication device 1600 may include a processor 1610, a memory 1620, a radio frequency (RF) module 1630, a display module 1640, and a user interface module 1650.

The communication device 1600 may be illustrated for convenience of description and, thus, some modules may be omitted. The communication device 1600 may further include required modules. In addition, some modules of the communication device 1600 may be divided into more detailed modules. The processor 1610 may be configured to perform the operation according to the embodiment of the present invention described with reference to the drawings. In detail, a detailed operation of the processor 1610 will be understood with reference to FIGS. 1 to 34.

The memory 1620 may be connected to the processor 1610 and may store an operating system, an application, a program code, data, and so on. The RF module 1630 may be connected to the processor 1610 and convert a baseband signal into a radio signal or convert a radio signal into a baseband signal. To this end, the RF module 1630 may perform analog conversion, amplification, filtering, and frequency upconversion or perform an opposite procedure thereto. The display module 1640 may be connected to the processor 1610 and may display various information items. The display module 1640 is not limited thereto and may use a well known element such as a liquid crystal display (LCD), a light emitting diode (LED), and an organic light emitting diode (OLED). The user interface module 1650 may be connected to the processor 1610 and may be configured with a combination with a well known user interface such as a key pad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although an example in which a method and apparatus for transmitting and receiving a synchronization signal for device-to-device (D2D) communication in a wireless communication system is applied to a 3GPP LTE system is described, the present invention is applicable to various wireless communication systems in addition to a 3rd generation partnership project long term evolution (3GPP LTE) system.

The invention claimed is:

1. A method of acquiring synchronization for device-to-device (D2D) communication by a user equipment (UE) in a wireless communication system, the method comprising:
receiving, by the UE in coverage of a cell related to a base station (BS), information on a synchronization type for the D2D communication;
acquiring synchronization for the D2D communication using a synchronization source, based on the information on the synchronization type; and
transmitting information on the synchronization source used by the UE to the BS,
wherein the synchronization source is one of i) the cell related to the BS and ii) an external synchronization source different from the BS, and
wherein, when the information on the synchronization type is related to the BS, the cell is used as the synchronization source, and when the information on the synchronization type is related to the external synchronization source, the external synchronization source is used as the synchronization source.

2. The method according to claim 1, wherein, when the information on the synchronization type is related to the BS, a synchronization for the D2D communication is acquired using only a synchronization signal received from the BS.

3. The method according to claim 1, wherein, when the information on the synchronization type is related to the external synchronization source, time synchronization for the D2D communication is acquired based on a synchronization signal received from the external synchronization source, and frequency synchronization for the D2D communication is acquired based on a synchronization signal received from the BS.

4. The method according to claim 1, further comprising:
receiving information on resource allocation from the BS,
wherein the information on resource allocation comprises information on a resource for receiving a synchronization signal from the external synchronization source.

5. The method according to claim 1, wherein the D2D communication is performed according to synchronization acquired from the external synchronization source during a predetermined time interval from a specific point in time defined by the external synchronization source.

6. The method according to claim 5, wherein, when a signal for the BS and a signal for a counterpart UE of the D2D communication are simultaneously scheduled in the predetermined time interval, the signal for the counterpart UE is prioritized over the signal for the BS.

7. The method according to claim 1, further comprising:
generating a D2D synchronization signal based on a sequence generation root index; and
transmitting the D2D synchronization signal to a counterpart of the D2D communication,
wherein the sequence generation root index is set to a different value when the cell is used as the synchronization source and when the external synchronization source is used as the synchronization source.

8. The method according to claim 1, further comprising:
transmitting data to a counterpart UE of the D2D communication,
wherein a parameter of the data is differently set when the cell is used as the synchronization source and when the external synchronization source is used as the synchronization source.

9. The method according to claim 8, wherein the parameter of the data comprises at least a demodulation reference signal sequence formation parameter or a scrambling sequence formation parameter.

10. A user equipment (UE) for acquiring synchronization for device-to-device (D2D) communication in a wireless communication system, the UE comprising:
a transceiver configured to transmit and receive a signal to and from a base station (BS), an external synchronization source different from the BS, or a counterpart UE of the D2D communication; and
a processor connected to the transceiver,
wherein the processor is configured to:
control the transceiver to receive, from the BS, information on a synchronization type for the D2D communication, wherein the UE is in coverage of a cell related to the BS,
acquire synchronization for the D2D communication using a synchronization source, based on the information on the synchronization type, and
control the transceiver to transmit information on the synchronization source used by the UE to the BS, wherein the synchronization source is one of i) the cell related to the BS and ii) an external synchronization source different from the BS, and wherein, when the information on synchronization type is related to the BS, the cell is used as the synchronization source, and when the information on the synchronization type is related to the external synchronization source, the external synchronization source is used as the synchronization source.

* * * * *